US005991709A

United States Patent [19]

Schoen

[11] Patent Number: 5,991,709

[45] Date of Patent: Nov. 23, 1999

[54] DOCUMENT AUTOMATED CLASSIFICATION/DECLASSIFICATION SYSTEM

[76] Inventor: Neil Charles Schoen, 9817 Freestate Pl., Gaithersburg, Md. 20879

[21] Appl. No.: 08/872,449

[22] Filed: Jun. 10, 1997

Related U.S. Application Data

[63] Continuation-in-part of application No. 08/271,906, Jul. 8, 1994, abandoned.

[51] Int. Cl.[6] .............................. G06F 17/60; G06F 17/40

[52] U.S. Cl. ...................... 704/1; 704/9; 707/1; 707/104; 707/531

[58] Field of Search ............................ 704/1, 9; 707/530, 707/531, 1, 2, 3, 9, 104; 705/1; 706/1, 933, 934, 925, 902; 380/3, 4

[56] References Cited

U.S. PATENT DOCUMENTS

| | | | |
|---|---|---|---|
| 4,318,184 | 3/1982 | Millett et al. . | |
| 4,881,179 | 11/1989 | Vincent . | |
| 5,371,807 | 12/1994 | Register et al. | 364/419.08 |
| 5,428,529 | 6/1995 | Hartrick et al. | 364/419.1 |
| 5,463,773 | 10/1995 | Sakakibara et al. | 364/419.08 |

*Primary Examiner*—Joseph Thomas

[57] ABSTRACT

A computer system for automatically classifying or declassifying military, intelligence, government, or industrial documents. Inputs to the system are classification or declassification guidelines, which describe the sensitive information, and the document(s) that need to be processed, all of which are in electronic format (e.g., output from word processor or other digital format). A database is created by a software program from the classification guidelines or rules, which is then stored in the computer system. The document(s) to be processed are searched and the database is used to identify classified portions of the documents, using a second software program (driven by the rules for determining classification levels), and the sensitive material is identified and the document(s) is modified to show the proper classification markings. This system will significantly reduce the time and manpower required to properly classify/declassify the larger number of sensitive documents in government/industry facilities or those currently being produced.

10 Claims, 8 Drawing Sheets

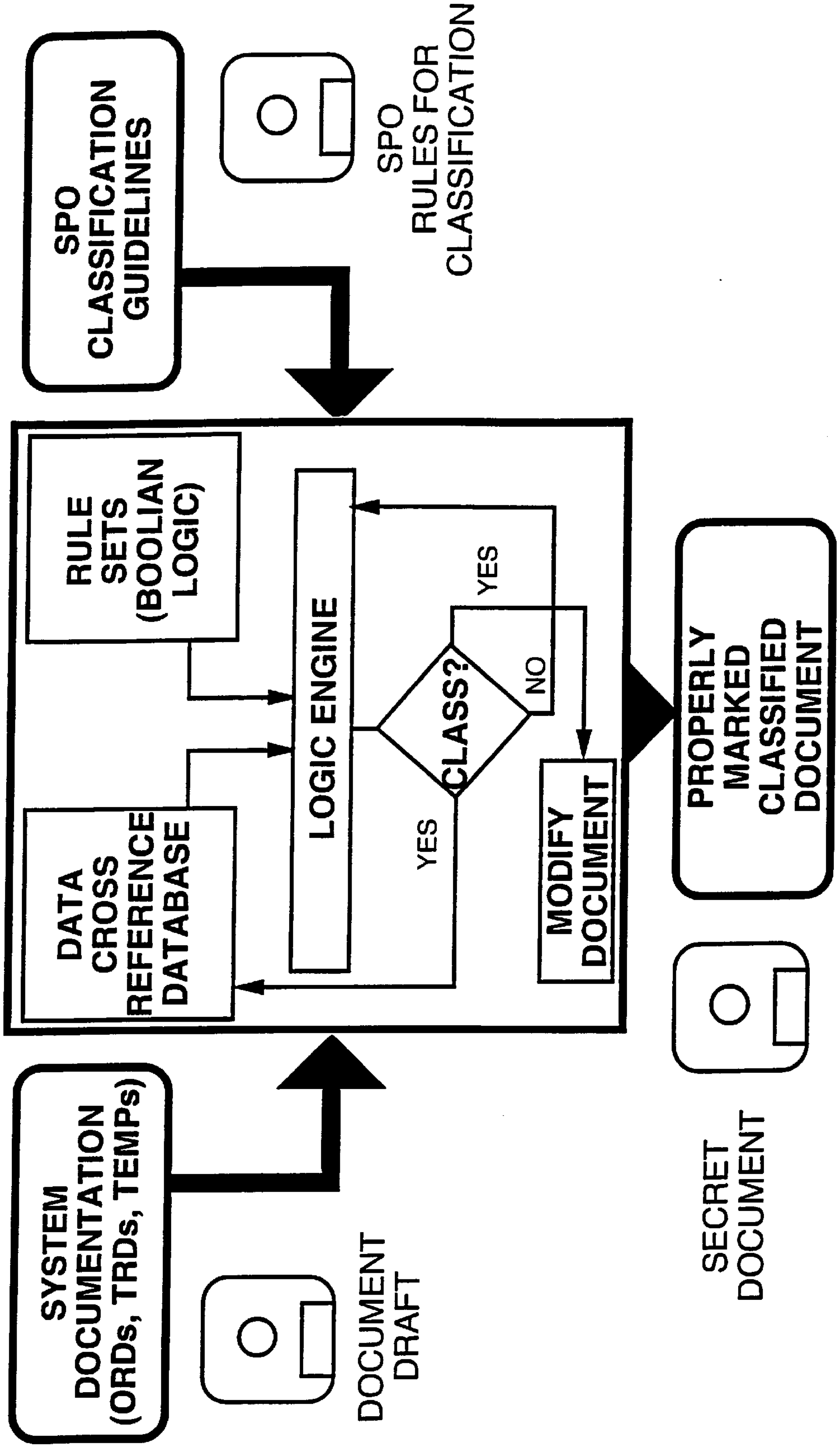
Figure #1

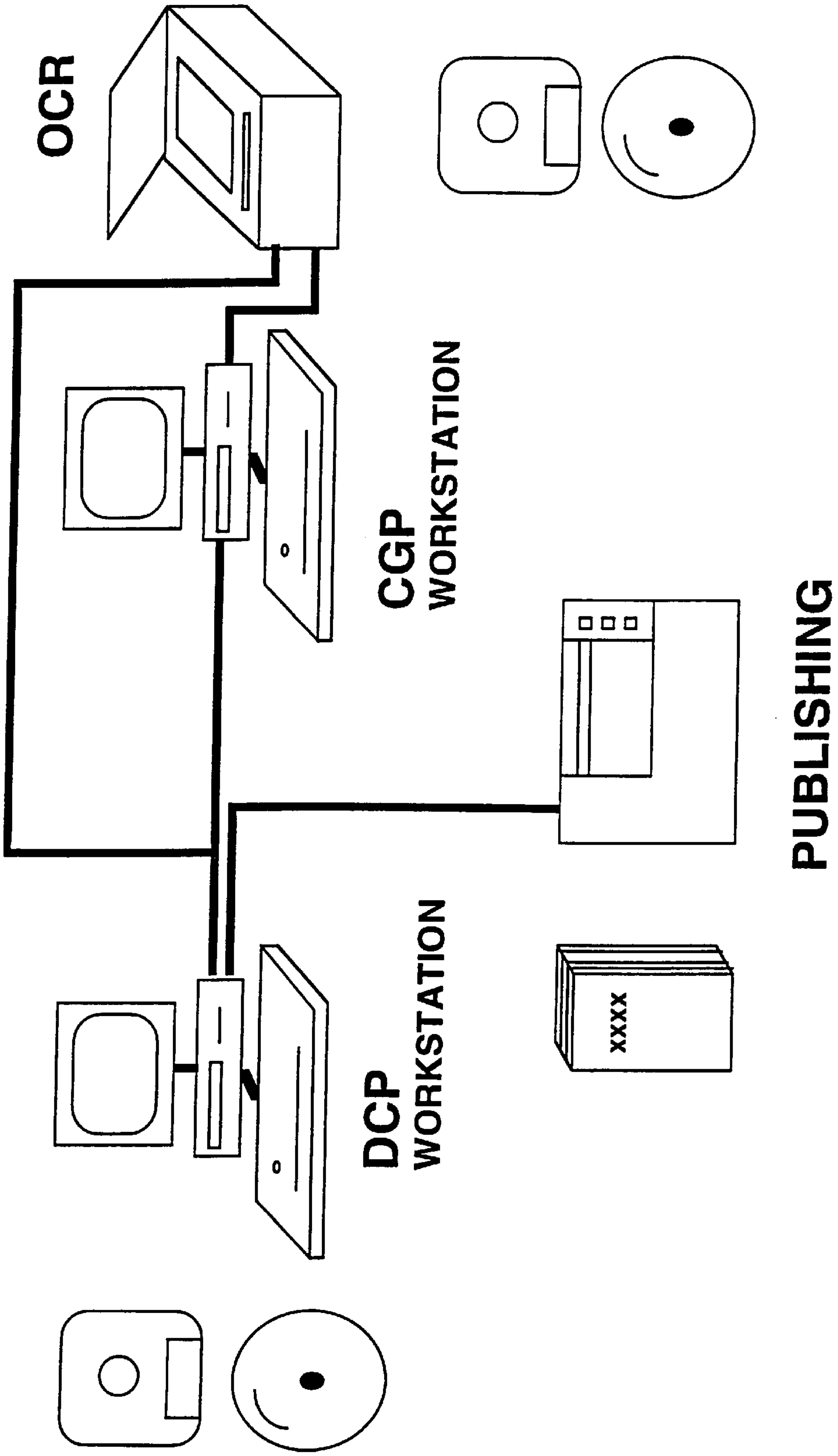
Figure #2

| INDEX | PARAMETER DESCRIPTOR | SYMBOL | VALUE | CLASSIFICATION | LOCATION (POINTER) |
|---|---|---|---|---|---|
| 1 | Radar Range | R | 3000.0 | CONFIDENTIAL | Array XYZ(1) |
| 2 | Target Radar Cross-section | Ω | -25.3 | SECRET | Array XYZ(2) |
| 3 | Radar Power | P | 3 E+6 | UNCLASSIFIED | Array XYZ(3) |
| xxx | R........ | xxx | yyy | S......... | Array XYZ(n) |

CGP Table #1

| PAGE/LINE DATA |
|---|
| 5/7,13,19,26 |
| 23/15,16,17 |
| 44/21 |
| xxx/yyy, zzz, fff |
| ....... |
| ...... |

Array XYZ(1)

| RULE | DESCRIPTOR | INDEX ITEMS | CLASSIFICATION |
|---|---|---|---|
| 1 | Radar Range and Power | 1,3 | SECRET |
| 2 | Radar Power and Aperture | 3, xxx | SECRET |
| 3 | R.......... | xxx, yyy,zzz | CONFIDENTIAL |

CGP Table #2

Figure #3

| PAGE | PARAGRAPH | CLASSIFICATION | RULE | DESCRIPTORS APPEARING |
|---|---|---|---|---|
| 1 | 1 | SECRET | 1 | Radar Range and Power |
| 1 | 2 | SECRET | 2 | Radar Power and Aperture |
| 1 | 3 | CONFIDENTIAL | 3 | R............... |
| 1 | 4 | U............... | n | S............ |
| 1 | Summary | SECRET | | Individual and Multiple Parameters |
| 2 | 1 | SECRET | 0 | Target Radar Cross-section |
| xxx | yyyy | S........... | zzz | A.............. |

DCP Table #1

DCP Table #2 (Filled in CGP Table #1)

Figure #4

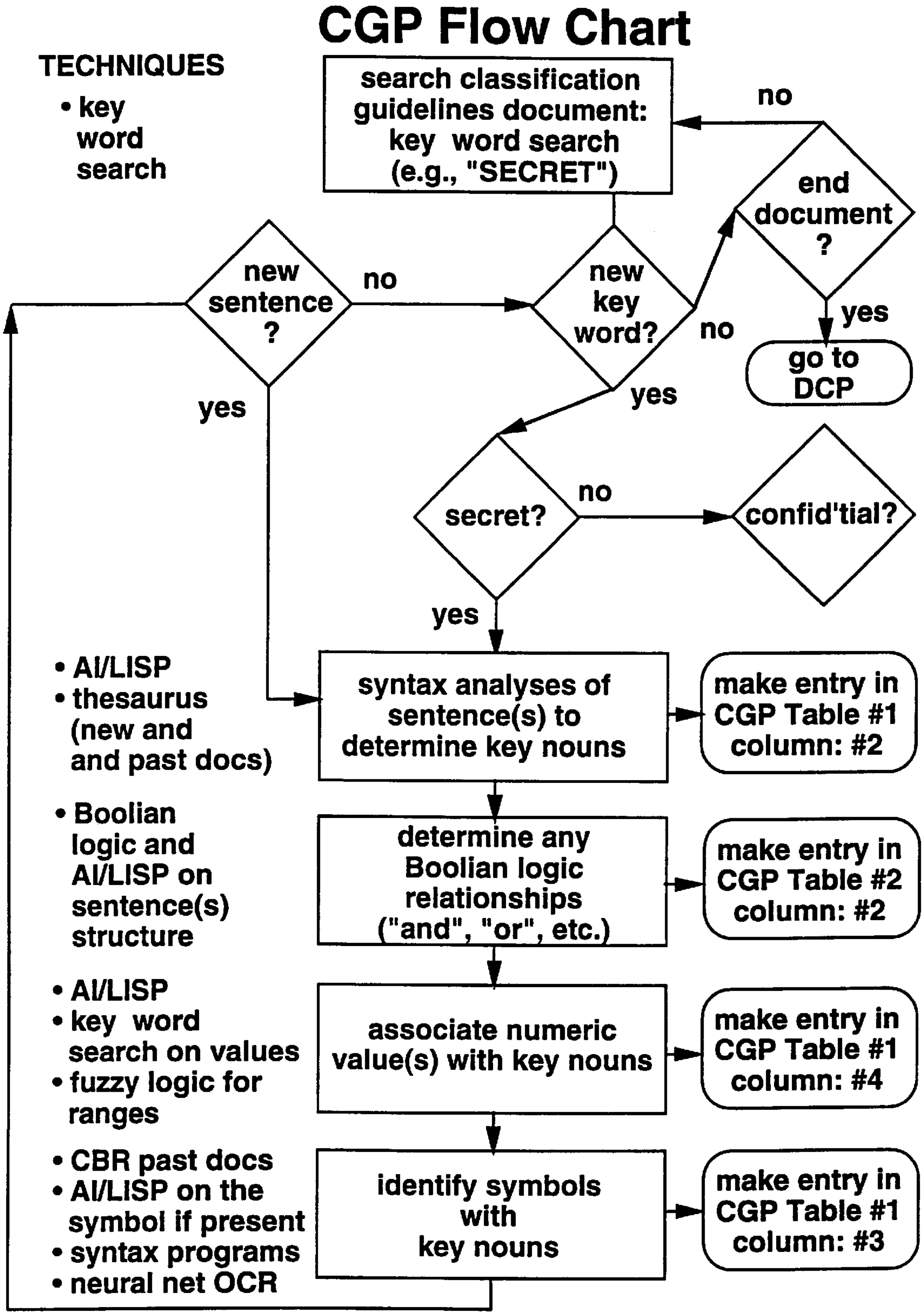
Figure #5

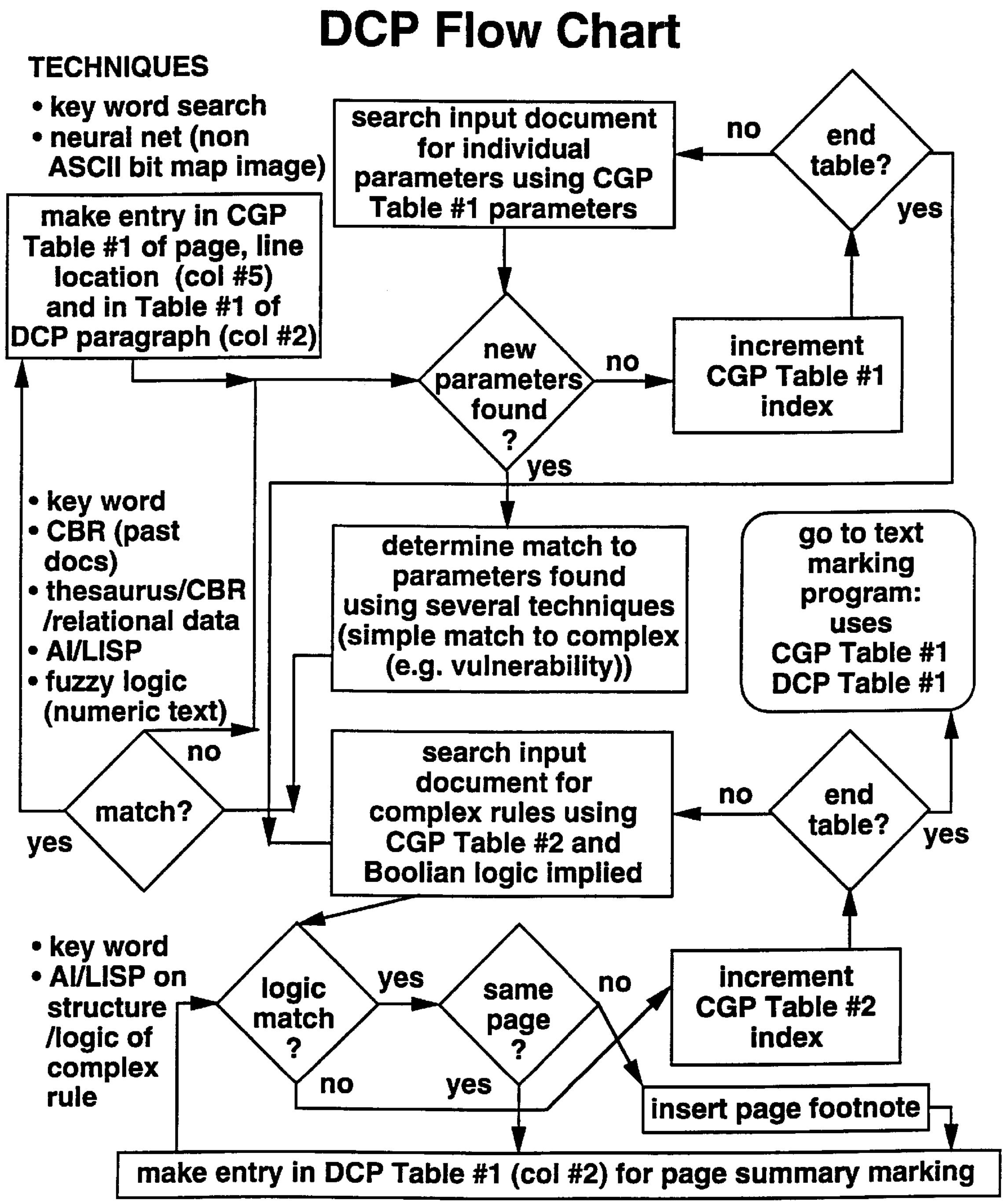
Figure #6

CGP Flow Chart
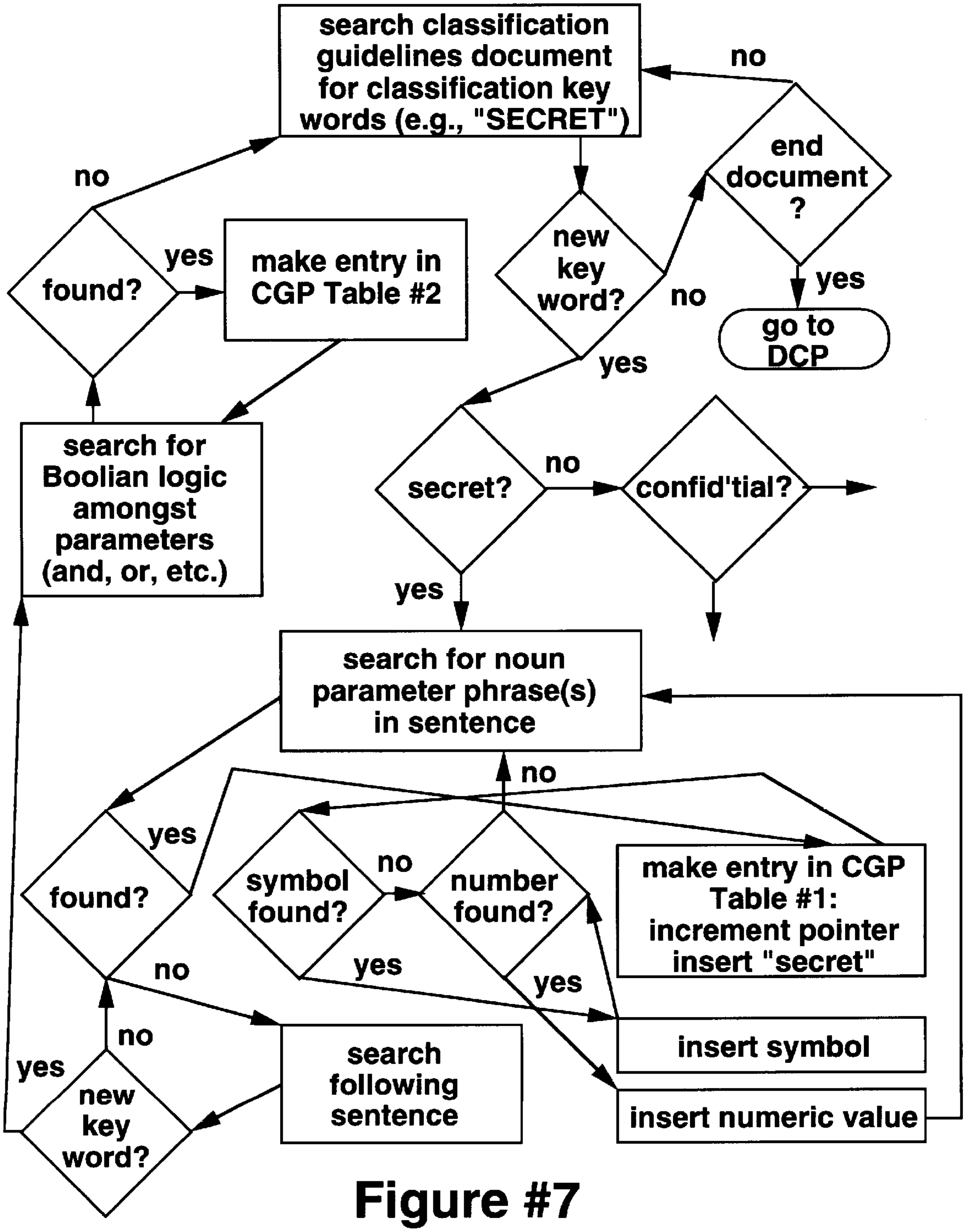
Figure #7

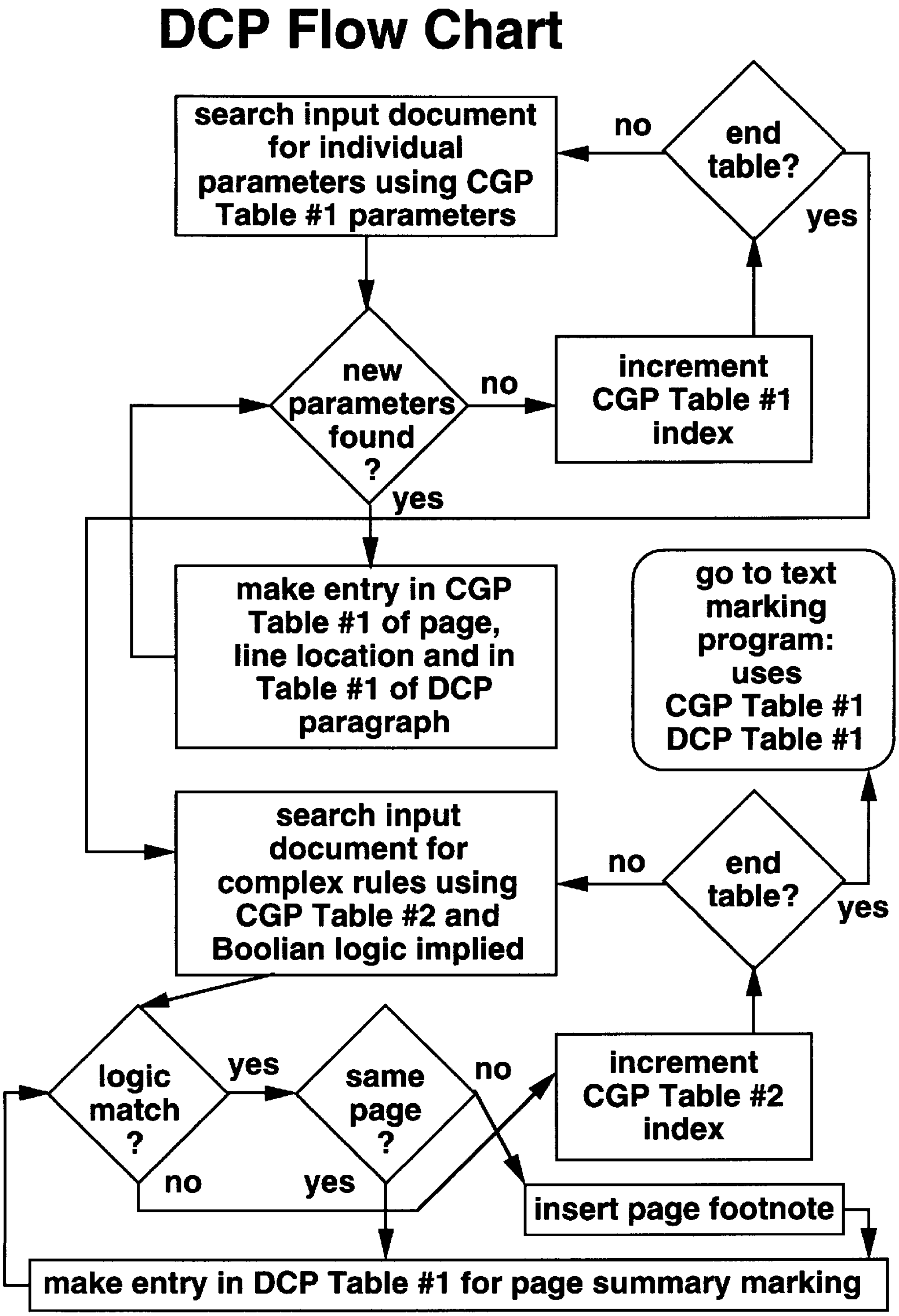
Figure #8

DOCUMENT AUTOMATED CLASSIFICATION/DECLASSIFICATION SYSTEM

This application is a continuation-in-part of application Ser. No. 08/271,906, filed Jul. 08, 1994, now abandoned.

BACKGROUND

The U.S. government currently creates thousands of classified documents each year. In addition, there is a backlog of currently classified documents that are due to be declassified by virtue of regulations allowing release after a predetermined time period set at the time of initial classification. Finally, there is considerable demand (e.g., under the Freedom of Information Act (FOIA)) for release of sensitive documents (or portions thereof).

The present process for classifying documents is both time consuming and labor intensive. Typically, a person associated with the program under which the document was produced must review the document to be classified and search through it to identify material called out in the classification guidelines document produced by the program office. This process can be complicated, due to the sometimes complex conditions which can lead to a classification decision. For example, certain documents become classified when a series of different technical parameters are present in the document, even though each parameter by itself may not be classified. The review process for proper document markings of the security classification may take from a few hours to several weeks, depending upon the document length and complexity of the classification guidelines.

The system described herein will allow the classification/declassification process to be done automatically, using computer programs to convert the requirements provided in the security classification guidelines into search logic conditions which are utilized in scans of the document by additional software programs to identify classified material. This automated system inserts proper classification markings into the electronic version of the document, so that a final draft of the document can be rapidly produced for final approval and release by an appropriate program office official.

SUMMARY OF THE INVENTION

The major components of a document automated classification/declassification system (DACS) generated in accordance with the present invention consist of the following functional components and/or subsystems.

The initial step or process requires the existence of computer-ready or digitized files (e.g., disc in word processor formats) of the document to be processed and the classification guidelines or security rules. For newly created documents, this requirement is usually met, since almost all organizations today produce documents on PC or text editing work stations. For older documents which require declassification or security review, an optical character recognition (OCR) system is used to scan in the document(s), which are then edited on a text work station to modify the formats and physical layout (text and figure pagination, etc.) to that desired for the finished product, absent the changes to be executed by the DACS process.

A major software component/subsystem of a DACS installation is the classification guidelines processor (CGP). The CGP extracts from the guidelines document the critical parameters, descriptors, and classification rules necessary to properly identify and mark the sensitive information in the document to be processed. The CGP program and associated work station utilizes state-of-the-art key word search, artificial intelligence algorithms, and language interpretation programs to identify critical system parameters and the inter-relationship governing their classification. This process is aided by human intervention, when required to resolve ambiguities, via an interactive video display in the CGP work station. The outputs of the CGP are tables with information on search parameters and classification rules/logic. Advanced versions of this subsystem may have sophisticated artificial intelligence capabilities to allow decisions to be made on "global" concepts or "fuzzy" logic, such as what combination of parameters or descriptive phrases constitutes a revelation of a "system vulnerability" that could be exploited as a result of unauthorized release of pieces of information that are not sensitive, in of themselves, but together may allow inference of a system sensitivity/vulnerability not specifically identified in the classification guidelines.

Another major component/subsystem is the document classification processor (DCP). The DCP program scans through the document to be processed to locate critical parameters and descriptors identified in the CGP tables, and augments these tables with information about these data (e.g., location/pagination pointers and numerical/symbol data, if appropriate). The DCP scan process can be iterative, since it may sequentially process each classification "rule" and modify the document. Modification of the document may change the markings of certain portions of the document, so an iterative process is likely to be necessary to arrive at a correctly market document. The DCP software program is also embedded in a work station (may be common with CGP hardware), with associated video display and editing capability.

The third major component of the DACS installation is the publishing subsystem. This component consists of printers and associated software, and allows the printing of properly marked versions of the now classified (or reclassified) document, or portions thereof. This subsystem can an be off-line work station which would utilize the output disc(s) (or files) of the DACS process. A benefit of this process is the ability to provide proper reproduction instructions/markings in the document itself.

The DACS capability is not limited to military or intelligence communities' security needs. There are similar needs in many government agencies dealing with sensitive information (State Department, FBI, etc.). In addition, the industrial and financial markets typically deal with proprietary, confidential, and competition-sensitive information, which also needs to be properly identified and marked accordingly.

Auxiliary hardware and software not explicitly mentioned above include off-the-shelf high speed OCR scanners, artificial intelligence programming language(s) (e.g., LISP, neural network operating systems), and other expert system programs and text search algorithms/programs. Also necessary for processing older paper-format documents are image scanners and associated embedded text extraction software to handle graphical and photographic information.

All mention of processing and artificial intelligence techniques are claimed as recitation of prior art, and the following references (listed by subject area) are provided to facilitate understanding of how these individual techniques representing prior art can be used in combination to create a new process and product:

Key Word Search

Current search "engines" in commercial word-processing programs MS Word and Wordperfect (Microsoft Corporation and Corel Corporation)

Internet search "engines" (Yahoo, Excite, Alta Vista, Magellan, Lycos)

"Introduction to Artificial Intelligence", Eugene-Charniak and Drew McDermott, Chapter 5, pgs. 255–271, Addison-Wesley Publishing Company, Reading, Mass.

"Text-Based Intelligent Systems: Current Research and Practice in Information Extraction and Retrieval", Edited by Paul S. Jacobs, Lawrence Earlbaum Associates, Publishers, Hillsdale, N.J., Part III.

"Statistical Methods, Artificial Intelligence, and Information Retrieval", Craig Stanfill and David L. Waltz, Thinking Machines Corporation.

Neural Networks

"Neurodynamic Computing", Robert E. Jenkins, Johns Hopkins APL Technical Digest, Volume 9, Number 3 (1988), pgs. 232–241.

"Neural Computation of Decisions in Optimization Problems", J. J. Hopfield and D. W. Tank, Biological Cybernetics, 52, pgs. 141–152.

Fuzzy Logic

"Fuzzy Sets, Uncertainty, and Information", George J. Klir and Tina A. Folger, State University of New York, Binghamton, Prentice Hall, Englewood Cliffs, N.J., pgs. 260–267.

"Fuzzy Logic, Neural Networks and Soft Computing", L. Zadeh, Communications of the ACM, 37 (3) Mar. 1994, pgs. 77–84.

Case-Based Reasoning (CBR)

"Case-Based Reasoning Development Tools: A Review", Ian Watson, University of Salford, Bridgewater Building, Salford, M5 4WT, United Kingdom.

"Case-Based Reasoning Projects", University of Kaiserslautern, Centre for Learning Systems and Applications, Research Group of Prof. Michael Richter, http://wwwagr.informatik.uni-kl.de/~lsa/CBR/CBR-projects.html.

"An Introduction to Case-Based Reasoning", Janet L. Kolodner, Artificial Intelligence Review, 6, pgs. 3–34, 1992.

Thesaurus/Relational Databases

Personal Library Software Corporation search engine: "PL/Win 4.15", Personal Library Software Corporation, 2400 Research Boulevard, Suite #350, Rockville, Md.

Artificial Intelligence (AI)/LISP Language

"Introduction To Artificial Intelligence", Eugene Charniak and Drew McDermott, Chapter 2, pgs. 33–48 (LISP), Chapter 4, pgs. 169–207 (Parsing Syntax), Addison-Wesley Publishing Company, Reading, Mass.

"Text-Based Intelligent Systems: Current Research and Practice in Information Extraction and Retrieval", Edited by Paul S. Jacobs, Lawrence Earlbaum Associates, Publishers, Hillsdale, N.J., 1992, Part I.

"Robust Processing of Real-World Natural-Language Texts", Jerry R. Hobbs, Douglas E. Appelt, John Bear, Mabry Tyson, and David Magerman, SRI International, pgs. 21–33.

"Mixed-Depth Representations for Natural-Language Text", Graeme Hirst and Mark Ryan, University of Toronto, pgs. 64–82.

"Artificial Intelligence, Expert Systems And Languages In Modeling and Simulation", Edited by C. A. Kulikowski, R. M. Huber and G. A. Ferrate, Elsevier Science Publishers B. V. (North-Holland), copyright IMACS, 1988.

"Combining An Expert System With A Data Base For An Application That Aids Decision-Making", Claude Bailly and Paul Y. Gloess (F), pgs. 93–99.

"Using LISP For Developing Discrete Event Simulation Models", Georgios I. Doukidis (GB), pgs. 31–42.

"Handbook Of Human-Computer Interaction", Editor Martin Helander, Elsevier Science Publishers B. V. (North-Holland), 1988, Chapter 44, pgs. 941–956.

Bayesian Inference Techniques

"Introduction To Artificial Intelligence", Eugene Charniak and Drew McDermott, Chapter 8, pgs. 453–482, Addison-Wesley Publishing Company, Reading, Mass.

DESCRIPTION OF THE DRAWINGS

FIG. 1 is a schematic of the DACS process showing the basic flow/logic, starting from the point where disc/digital versions of the classification guidelines and the document to be processed are available.

FIG. 2 shows an embodiment of a system in accordance with the present invention and identifies the major hardware functional components/subsystems of a DACS installation.

FIG. 3 shows an embodiment for the classification guidance processor CGP output tables.

FIG. 4 shows an embodiment for the document classification processor DCP output tables.

FIG. 5 shows a flow chart of the software logic for the creation of the classification guidance processor CGP output tables.

FIG. 6 shows a flow chart of the software logic for the creation of the document classification processor DCP output tables.

FIG. 7 shows a flow chart of a preferred embodiment of the software logic for the creation of the classification guidance processor CGP output tables, using keyword search techniques.

FIG. 8 shows a flow chart of a preferred embodiment of the software logic for the creation of the document classification processor DCP output tables, using keyword search techniques.

DETAILED DESCRIPTION OF PREFERRED EMBODIMENTS

The basic function of the DACS process is to convert document classification guidelines to classification "rules," which can be utilized by computer algorithms to electronically scan documents (to be processed for security marking) and automatically assign proper security markings to all material contained in the documents. The NCS schematic in FIG. #1 is a block diagram of the top level process flow for a general embodiment of the present invention. The following figures and descriptions are intended to define the basic components, subsystems, and configuration for the flexible and efficient operation, or preferred embodiment, of this invention. This is one of several configurations possible, and should not be construed to limit the scope of this invention in any way.

FIG. #2 shows the major hardware components of a DACS installation. For automated, rapid processing of documents, it is necessary that both the documents and the classification guidelines be in computer-ready format (e.g., electronically stored in computer memory or on removable magnetic/optical media). If the above documents exist only as hard copy, then they need to be scanned, via an optical character recognition (OCR) system shown in FIG. #2, and then placed on electronic storage media (RAM, hard disc, or removable storage) for proper formatting. The scanned documents need to be converted to word processing format suitable for video display and key word searches.

The first major subsystem in the DACS process is the classification guidelines processor (CGP); the hardware is shown in FIG. #2 labeled as the CGP work station. The main purpose of the CGP software is to extract from the text of the classification guidelines document the necessary critical parameters and descriptors, along with the classification "rules" that govern the proper marking of documents. The CGP processor itself contains artificial intelligence algorithms, language interpretation programs, and key word search algorithms that allow it to automatically convert text descriptors of classification regulations into tables and logic rules for the classification/declassification process. The video capability shown in FIG. #2 allows human intervention into the rule generation process, mainly to resolve ambiguities and adjust formats.

The computer hardware (including desktop personal computer systems, optical scanner/OCR device, printer and floppy disc/CD-ROM storage media shown in FIG. #2) and software for word processing, document storage, retrieval, transmission, video display and printing are commercial-of-the-shelf (COTS) products and are well known in the art. Software for the document search process techniques described in this specification and identified in the claims also are well known in the art, but those techniques with COTS software may need to be modified or augmented to integrate with new software and other search algorithms comprising the DACS system.

An example of tabular output from the CGP algorithms is shown in FIG. #3. Each critical technical parameter identified in the classification guidelines appears as an indexed table entry, containing the descriptor phrase, symbol, value, and classification level. Also provided is a "pointer" address for later processing, which references the location of these items in the actual document to be classified. All this information is shown in CGP Table #1.

Examples of logic rules for classification are shown in CGP Table #2. These rules are distilled from the guidelines and cover combinations of parameters with different individual classification levels, but which change when all these parameters appear on a single page, or are contained somewhere in the document. The tables shown in FIG. #3 form the basis for the next processing step—scans through the document to be classified.

The next major subsystem in the DACS process is the document classification processor (DCP); the hardware is shown in FIG. #2 labeled as the DCP work station. The DCP software scans through the subject document to locate critical parameters and descriptors identified in the CGP tables. The software stores this information for use in subsequent scans. These additional scans are made to locate matching conditions for each classification guideline "rule" stored in the CGP Table #2. These multiple scans are then used to build up a picture of the required classification markings necessary, as shown in FIG. #4, DCP Table #1. This table provides instructions to the publishing subsystem on how to mark each page of the document.

The third major subsystem is the publishing unit, consisting of a hard copy printer and common components from the DCP subsystem (video display and fixed and removable disc/storage devices). The publishing subsystem software allows operator viewing and modification of the draft document, as well as commands to print and/or store the resulting document, or portions thereof.

Accordingly, it is to be understood that the drawings and descriptions herein are offered by way of example to facilitate comprehension of the invention and should not be construed to limit the scope thereof.

What is claimed is:

1. A system for automatically and rapidly classifying or declassifying military, intelligence, government, and industrial documents to protect sensitive or classified information, comprising:

automated means for converting input documents and classification guidelines documents to computer-ready electronic storage media, including use of computer work stations with optical scanning hardware and software;

automated and human-assisted means, including computer workstations with document-editing and processing hardware and software algorithms which can process autonomously or with human intervention, for extracting rules from the computer-ready classification guidelines documents which are suitable for use by additional computer software and hardware in classification processing of said input documents;

automated and human-assisted means, including said additional computer software and hardware which can also process autonomously or with human intervention, for searching through the computer-ready input document by utilizing classification algorithms based on said rules to find and identify the location of classified or sensitive material within the document;

automated means for properly marking said input document, by inserting text or other marking characteristics in electronic format into said input document at appropriate locations to mark or declassify by deletion classified or sensitive information, and further means for producing hard copies and computer-ready removable storage discs of the finished processed input document.

2. A system according to claim 1 wherein said automated means for converting input documents and classification guidelines documents to computer-ready electronic storage media comprises optical character recognition (OCR) devices/computer scanners, word processing software programs, graphical image processing software for identification of non-ASCII based embedded text, microfilm/microfiche systems, artificial intelligence and neural network pattern recognition programs, and human-assisted transfer using voice recognition systems or keyboard entry.

3. A system according to claim 1 wherein said rules created from classification guidelines range from simple rules to very complex rules, where:

a simple rule consists of a single parameter and an assignment of its classification via key word searches by grammatical analyses of classification guideline data, wherein the parameter is the noun and the classification secret is the adjective, using a language syntax processing algorithm and a very complex rule includes multiple parameters, the identification of global aspects, the use of parameters in combination and in conjunction with broad-based attributes, and requires means for translation of classification guideline text into said complex rule comprised of parameters or descriptors using external documents, including thesauri, combined with artificial intelligence techniques, that can be used to provide assignments of classification during the subsequent processing of said input documents; and wherein:

said automated and human-assisted means for extracting said simple and complex rules from said computer-ready classification guidelines documents comprises said computer workstations with document-editing and processing hardware and software which execute key word search algorithms, relational databases queries, language/grammatical interpretation/syntax programs, artificial intelligence programs, neural network pattern recognition programs, Boolean or Bayesian logic algorithms, fuzzy logic algorithms, case-based reasoning programs, and human-assisted intervention by computer prompting for manual input to extract and produce said rules suitable for use by said classification algorithms during the input document processing procedure.

4. A system according to claim 1 wherein said automated and human-assisted means, including said additional computer software and hardware which can also process autonomously or with human intervention, for searching through input documents utilizing the classification algorithms/rules to identify sensitive/classified material within the documents includes: key word search algorithms, relational databases, artificial intelligence programs, fuzzy logic algorithms, hardware processors for rapid search/template matching, case-based reasoning programs, programs to handle graphical information for identification of non-ASCII based embedded associated text, and human-assisted intervention.

5. A system according to claim 1 wherein automated means for properly marking documents by inserting text or other marking characteristics in electronic format into said documents includes: word processing programs, video display systems, associated computer work stations, and human-assisted intervention to mark or declassify by deletion of text;

and means for processed document output including printers for hard copy, removable storage media, displays, network file server storage media, and microfilm/microfiche systems.

6. A system according to claim 1 wherein said means of properly marking documents comprises additional means to mark cover pages and add footnotes to document pages, that provide instructions for reproducing and marking any portions of the document that could be copied, which separately have a lower classification than that of the aggregate of the total information reproduced according to the classification guidelines or rules.

7. A system according to claim 1 wherein all the input documents, output documents, classification guidelines documents and derived classification databases are accessible by local network storage means to any single installation site, by means of secure local communications networks, including LANs or WANs or via disc storage with dedicated wiring to said single installation site computer, to provide the capability for comparative scans by repeated searching across documents from similar programs at the same or remote sites for comparative purposes or complex assessments/interpretations of classification guidelines.

8. A system according to claim 1 wherein all said computer software and hardware means operate from a single, separate computer work station or main frame and also, via communications module means, becomes a node which can access large numbers of classification guidelines and documents in remote locations via the Itelink, a large interactive network with government-approved security and encryption for all communications links which transfer classified documents.

9. A system according to claim 9 which can access industrial, financial and commercial documents via a communications module, where said communications links include future secure Internet nodes, wherein said documents can then be modified upon receipt by users, whereby;

said automated means for extracting rules from the computer-ready classification guidelines documents which are suitable for use by said additional computer software and hardware in classification processing of input documents includes rules and classification guidelines that cannot be altered by the document recipient, which are used for modifications to received documents; and said automated means for properly marking said input document, by inserting text or other marking characteristics in electronic format into said input document at appropriate locations to mark or declassify by deletion private/proprietary or sensitive information, includes means to enter said desired marking modifications and automatically alter text and non-ASCII based embedded text within imagery, subject to the condition that the recipient can request markings that show material at a lower classification than said rules extracted from classification guidelines would require.

10. A system according to claim 8 which can access industrial and commercial documents via the Internet, and these received input documents can then be modified upon receipt by users, wherein;

said automated means for extracting rules from the computer-ready classification guidelines documents which are suitable for use by said computer software and hardware in classification processing of said received input documents includes user-created rules and classification guidelines for desired marking modifications to said received input documents; and said automated means for properly marking said received input document by inserting text in electronic format into said received input document at appropriate locations includes the marking or declassifying by deletion or black-out of classified or sensitive information and means to enter said desired marking modifications automatically to alter text and imagery based on said user-created rules and classification guidelines.

* * * * *